(12) United States Patent
Tetsuhashi et al.

(10) Patent No.: US 8,078,229 B2
(45) Date of Patent: Dec. 13, 2011

(54) PORTABLE COMMUNICATION TERMINAL, FUNCTION MENU DISPLAY METHOD AND PROGRAM TO BE USED IN PORTABLE COMMUNICATION TERMINAL

(75) Inventors: Hideaki Tetsuhashi, Tokyo (JP); Hiroshi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 737 days.

(21) Appl. No.: 12/096,114

(22) PCT Filed: Nov. 30, 2006

(86) PCT No.: PCT/JP2006/323915
§ 371 (c)(1),
(2), (4) Date: Jun. 4, 2008

(87) PCT Pub. No.: WO2007/072664
PCT Pub. Date: Jun. 28, 2007

(65) Prior Publication Data
US 2009/0318187 A1 Dec. 24, 2009

(30) Foreign Application Priority Data
Dec. 21, 2005 (JP) .................. 2005-367307

(51) Int. Cl.
*H04B 1/38* (2006.01)
*H04M 1/00* (2006.01)
*H04M 1/725* (2006.01)

(52) U.S. Cl. .......... 455/566; 455/550.1; 455/567; 455/412.1

(58) Field of Classification Search .............. 455/566, 455/567, 550.1, 412.1
See application file for complete search history.

(56) References Cited

U.S. PATENT DOCUMENTS
7,171,343 B2 * 1/2007 Walster et al. .......... 703/2
2006/0035679 A1 * 2/2006 Han et al. .......... 455/566

FOREIGN PATENT DOCUMENTS
| EP | 1122519 A | 8/2001 |
| EP | 1283461 A | 2/2003 |
| JP | 10161832 A | 6/1998 |
| JP | 2001221644 A | 8/2001 |
| JP | 2004287702 A | 10/2004 |

OTHER PUBLICATIONS

Supplementary European Search Report for EP 06 83 3718 completed Oct. 1, 2010.
NTT Docmo Inc., "Toriatsukai Setsumeisho Kihonhen FOMA F900iC" '04.8, second edition, NTT Docomo Inc., pp. 9, 37-40, 72, 73, 239-245, 326-333.
International Search Report for PCT/JP2006/323915, mailed Mar. 6, 2007.

* cited by examiner

*Primary Examiner* — Tilahun B Gesesse

(57) ABSTRACT

The present invention provides a portable communication terminal that allows users to use only basic functions without having to peruse an instruction manual.
The basic module (21) of a memory device (2) includes a simple-mode basic module (211) that shows a GUI mode customized to be user friendly, and a custom-mode basic module (212) that shows a GUI mode for letting the user select only desired functions at the time of initial activation. If the "simple-mode" is selected through the basic module (21), the menu display screen of an output device (3) displays only the function menu of the simple-mode basic module (211). If the "custom-mode" is selected through the basic module (21), the menu display screen of the output device (3) displays the function menu of the custom-mode basic module (212) and functions selected through the custom-mode basic module (212).

20 Claims, 8 Drawing Sheets

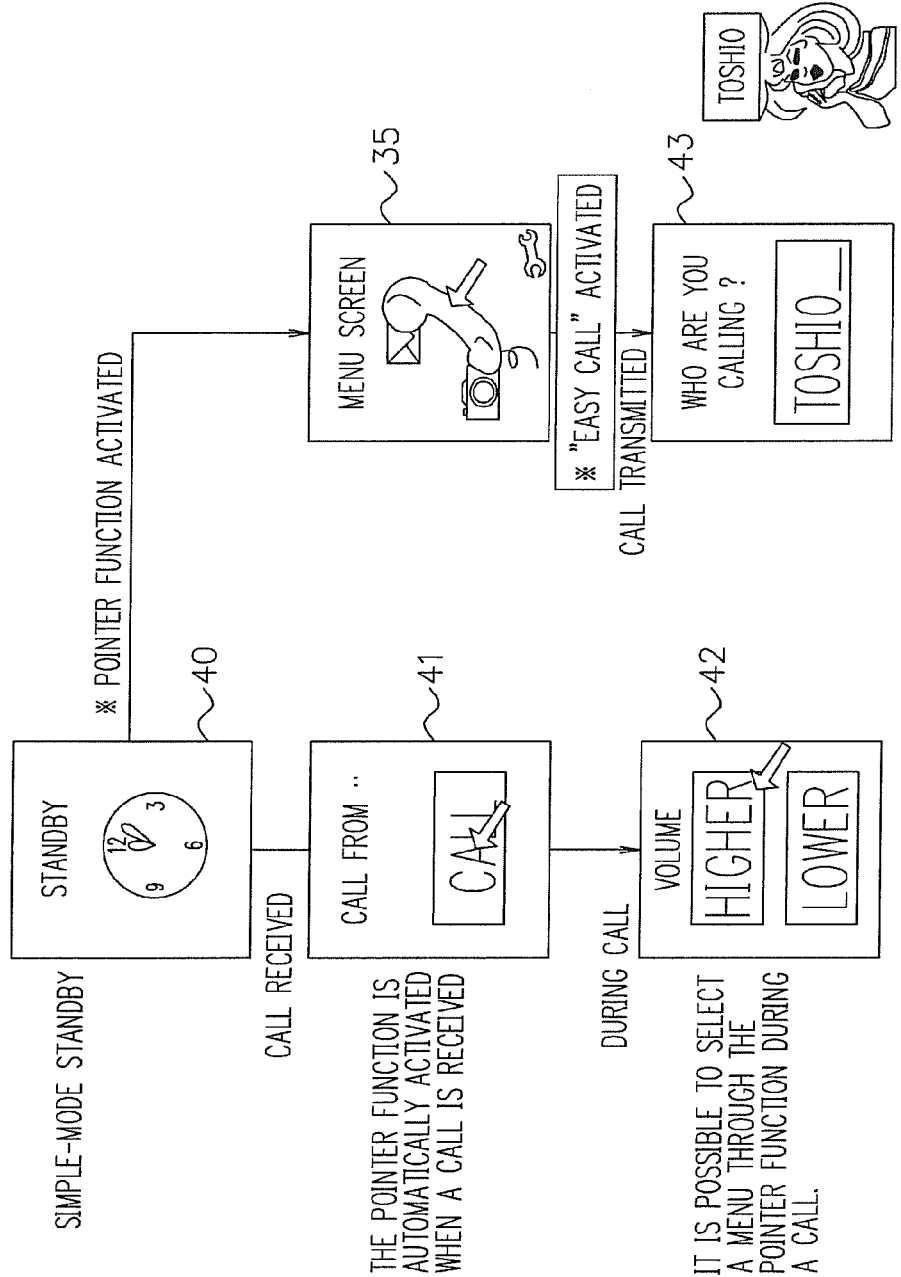

PORTABLE COMMUNICATION TERMINAL, FUNCTION MENU DISPLAY METHOD AND PROGRAM TO BE USED IN PORTABLE COMMUNICATION TERMINAL

FIELD OF THE INVENTION

The present invention relates to a portable communication terminal and a function menu display method and program to be used in the portable communication terminal, and more particularly, to a portable communication terminal that includes a menu customizing function for selecting desired functions.

BACKGROUND OF THE INVENTION

In recent years, portable communication terminals such as portable telephone devices have a browsing function for viewing the Internet, a digital camera function, an electronic mail transmitting and receiving function, a music replay function, and the like, as well as a menu for selecting items for the functions.

In a conventional portable communication terminal, however, contents of a menu are complicated, because there are various kinds of functions mounted in the terminal. In some portable telephone devices, a "simple mode" is employed. In the "simple mode", the functions mounted in the device can be shuffled, so as to form a menu that is subjectively easy to see and easy to use.

In a case where a user of a portable telephone device uses only basic function, too many functions only cause confusion at the time of use, and a most of "easy-to-use" menus provided by the manufacturer of the portable telephone device is left unused.

To display this type of menu, there has been proposed a method of automatically customizing a menu so that users need to perform only a small number of operations to choose menu items and data to be used frequently (see Patent Document 1, for example). By this method, the frequency of use of each menu item is measured immediately below the menu item hierarchical level, and the menu items having high frequency of use are put at higher hierarchical levels.

There has also been proposed a method by which parameters of menu elements are locked or unlocked and the state thereof is displayed or not displayed on the menu option screen (see Patent Document 2, for example). By this method, an automatic mode or a manual mode can be mounted, and, when the automatic mode is selected, the parameters with lower (higher) frequency of use are automatically locked (unlocked).

Patent Document 1: Japanese Patent Application Laid-Open No. 2004-287702
Patent Document 2: Japanese Patent Application Laid-Open No. H10-161832

DISCLOSURE OF THE INVENTION

Problems to be Solved by the Invention

In a GUI (Graphical User Interface) that is customized to be user friendly and is realized now in portable communication terminals such as portable telephone devices (which will be hereinafter referred to as the "simple mode"), display of various functions are arranged to see easily in displaying a menu. However, all the functions are still displayed, and the menu is not easy to use and simple enough for anyone.

By another conventional menu display technique, functions with higher frequency of use are preferentially displayed on the menu, based on the state of usage by the user. However, an extra memory is required to form a hierarchical menu in order to display functions with higher frequency of use at higher hierarchical levels.

In some types of portable communication terminals, each user can create a shortcut menu for himself/herself. However, it is very difficult for some people to create such an original menu, and the useful shortcut function is left unused and ignored.

With the above conventional simple mode, there is a problem that functions not to be used at all are displayed, and there is also a problem that useful and convenient customizing functions are meaningless to those who use only the basic functions of portable communication terminals.

In the case of the menu display method disclosed in Patent Document 1, extra memories are spent to secure the hierarchy structure, and the hierarchical structure is meaningless to those who use only the basic functions. If the hierarchical function is not employed, the required memory size can be reduced, and improvements can be made structurally and economically.

In the case of the menu display method disclosed in the Patent Document 2, for users who often use a "bookmark" of a web browsing function developed for portable telephone devices, the "bookmark" is unlocked when the user opens an option of the function, while for users who rarely use the "bookmark", the "bookmark" is locked even when the user try to open the option of the function.

In such a case, it is possible to manually set so as not to display the functions on the display, but manual setting is difficult for those who use only the basic functions. Some users do not even need the web browsing function itself. In view of this, it is desirable that not only the option of the functions can be locked, but also the web browsing function can be switched off.

Therefore, an exemplary object of the present invention is to eliminate the above-described disadvantages and to provide a portable communication terminal that allows users to easily use only basic function without having to peruse an instruction manual and a function menu display method and program to be used in such a portable communication terminal.

Means for Solving the Problems

A portable communication terminal in accordance with the present invention is a portable communication terminal that includes various functions and is capable of displaying a menu showing the functions on a screen. This portable communication terminal includes: a memory device that stores a simple-mode basic module that is designed for displaying a menu showing only preset particular functions on the screen, and a custom-mode basic module that is designed for displaying a menu showing only functions selected by setting from outside on the screen; a unit that displays a screen for selecting one of the simple mode and the custom mode at the time of initial activation; and a unit that reads the basic module corresponding to the selected mode on the screen from the memory device, and then activates the basic module.

A function menu display method in accordance with the present invention is a function menu display method to be utilized in a portable communication terminal that includes various functions and is capable of displaying a menu showing the functions on a screen. This function menu display method includes: displaying a screen for selecting one of a simple-mode in which a menu showing only preset particular functions is displayed on the screen, and a custom-mode in which a menu showing only functions selected by setting from outside is displayed on the screen at the time of initial activation; and reading a basic module corresponding to the selected mode on the screen from a memory device that stores a simple-mode basic module and a custom-mode basic module, and then activating the basic module.

A function menu display program in accordance with the present invention is a program for displaying a function menu used in a portable communication terminal that includes various functions and is capable of displaying a menu showing the functions on a screen. This program is executed to cause a computer of the portable communication terminal to: display a screen for selecting one of a simple-mode in which a menu showing only preset particular functions is displayed on the screen, and a custom-mode in which a menu showing only functions selected by setting from outside is displayed on the screen at the time of initial activation; and read a basic module corresponding to the selected mode on the screen from a memory device that stores the simple-mode basic module and a custom-mode basic module, and then activate the basic module.

A portable communication terminal of the present invention is namely characterized by providing the most easy-to-use GUI (Graphical User Interface) to each user by selecting particular functions.

That is, by selecting the simple-mode at the time of initial activation in the portable communication terminal of the present invention, an "easy call" function, an "easy mail" function, and an "easy camera" function are automatically set for settings of call, electronic mail, camera as indicated in the basic module.

Here, the "easy call" function and the "easy mail" function are functions that facilitate reading addresses from the address book with such as the use of GUI or audio input. The "easy camera" function is a function that allows the user to take optimum photographs automatically, without having to set AF (Auto Focusing), white balance, contrast, flash, image size, and the like, which are normally required for a camera function.

When the camera is activated through the "easy camera" function, the menu button and the function setting display of AF, white balance, contrast, flash, image size, and the like are not displayed, but only an image as a finder and a "photo" button are displayed on the screen. This is for users who are not familiar with how to use the photographing function but wishes to take photographs. With this arrangement, users can smoothly take clear photographs, without special settings.

Hereinafter, the GUI customized to be an easy-to-use mode will be referred to as the "simple-mode". By selecting the "simple-mode", only the icons of call, mail, and camera functions are displayed on the menu screen for users. Therefore, a user who does not need to use complicated functions can set easily. Also, in the portable communication terminal of the present invention, the usage module is designed to be displayed on the menu, and there is specially no need to maintain a memory to store the menu settings of each user.

Further, in the portable communication terminal of the present invention, users who use particular functions frequently should select a mode in which only the functions to be frequently used by a users (hereinafter referred to as the "custom-mode") are selected at the time of initial activation. In this manner, each user does not need to take a trouble of creating an original menu, and an optimum menu can be provided for each user. In the "custom-mode", it is also possible to display all the functions on the menu.

In the "simple-mode", a menu that shows only the icons of call, mail, and camera functions is displayed from the start. In the "custom-mode", a menu that shows functions selected by a user is displayed. Accordingly, it is possible to provide a menu that is useful to everyone, instead of a conventional menu that is useful only to a particular one.

As described above, in the portable communication terminal of the present invention, by selecting a usage mode such as the "simple-mode" or the "custom-mode" at the time of initial activation, it is possible to realize a function menu that is useful to all users including users who use only the basic functions, users who customize a menu to use only the selected functions, and users who want all the function to be displayed and wish to use all the functions.

EFFECTS OF THE INVENTION

The present invention provides the above described structure and operations, so as to allow users to easily use only the basic functions without having to peruse an instruction manual.

BEST MODE FOR CARRYING OUT THE INVENTION

Exemplary embodiments of the present invention will be described with reference to the accompanying drawings hereinafter. FIG. 1 is a block diagram showing an example structure of a portable communication terminal in accordance with an exemplary embodiment of the present invention. In FIG. 1, the portable communication terminal in accordance with this exemplary embodiment of the present invention includes: an input device 1 with a numeric keypad, a menu button, arrow keys, and the like; a memory device 2 that includes a basic module 21 including three functions of a call function, an electronic mail function, and a camera function, and an expansion module 22; and an output device 3 such as a display that displays the modules to be used as a menu.

The basic module 21 of the memory device 2 includes a simple-mode basic module 211 and a custom-mode basic module 212. Here, the "simple-mode" refers to a GUI (Graphical User Interface) mode that is customized so that users can easily use. The "custom-mode" is a GUI mode in which only the functions to be used by the user are selected at the time of initial activation.

In a case where the "simple mode" is selected through the basic module 21, only the function menu of the simple-mode basic module 211 is displayed on the menu display screen of the output device 3 of the portable communication terminal. In a case where the "custom mode" is selected through the basic module 21, the function menu of the custom-mode basic module 212 and the functions selected through the expansion module 22 are displayed on the menu screen.

FIG. 2 is a block diagram showing a specific example structure of the portable communication terminal in accordance with the exemplary embodiment of the present invention. In FIG. 2, the portable communication terminal 10 includes the input device 1, the memory device 2, the output device 3, an antenna 11, a radio unit 12 that exchanges signals with base stations (not shown) through the antenna 11 in communication, a control unit 13 that controls the respective components, and a camera unit 18 that includes an image pick-up element. The input device 1 includes a key input unit 14 with a numeric keypad, a menu button, and arrow keys, and a microphone 15 that inputs sound. The memory device 2 includes the above-described basic module 21 and the expansion module 22, and stores programs to be executed by the control unit 13. The output device 3 includes a display unit 16 such as a display, and a speaker 17 that outputs sound.

FIG. 3 is a block diagram showing a specific example of the basic module 21 of FIG. 1. In FIG. 3, the simple-mode basic module 211 of the basic module 21 includes an "easy call" function, an "easy mail" function, and an "easy camera" function. The custom-mode basic module 212 of the basic module 21 includes a "normal call" function, a "normal mail" function, and a "normal camera" function.

The "easy call" function and the "easy mail" function are functions that facilitate reading addresses from the address book with the use of the GUI or audio input or the like. The "easy camera" function is a function that allows the user to automatically take optimum photographs, without having to set AF (Auto Focusing), white balance, contrast, flash, image size, and the like, which are normally required for a camera function.

Meanwhile, the expansion module 22 includes: a web browsing function that is designed for the portable communication terminal 10 such as a portable telephone device; an application function that is realized by an application software designed for the portable communication terminal 10; a music replaying function for replaying music; and a full-browser function that enables to view the Internet like a personal computer.

Accordingly, when the "simple-mode" is selected through the basic module 21, the "easy call" function, the "easy mail" function, and the "easy camera" function are displayed on the menu display screen of the portable communication terminal 10. When the "custom-mode" is selected through the basic module 21, the functions selected through the expansion module 22, as well as the "normal call" function, the "normal mail" function, and the "normal camera" function, are displayed on the menu display screen.

FIG. 4 shows a selection of the usage functions of the expansion module 22 in accordance with the exemplary embodiment of the present invention. FIG. 5 is a flowchart showing a menu displaying operation to be performed by the portable communication terminal 10 at the time of initial activation in accordance with the exemplary embodiment of the present invention. FIG. 6 is a flowchart showing a usage mode selecting operation to be performed by the portable communication terminal 10 in accordance with the exemplary embodiment of the present invention.

FIG. 7 illustrates a menu displaying operation to be performed by the portable communication terminal 10 in accordance with the exemplary embodiment of the present invention. FIG. 8 is a flowchart showing a menu displaying operation to be performed by the portable communication terminal 10 at the time of resetting in accordance with the exemplary embodiment of the present invention. FIG. 9 illustrates the "easy call" function of the portable communication terminal 10 in accordance with the exemplary embodiment of the present invention. Referring to FIGS. 1 to 9, the menu displaying operations to be performed by the portable communication terminal 10 in accordance with the exemplary embodiment of the present invention will be described. The operations illustrated in FIGS. 5, 6, and 8 can be realized by the control unit 13 executing a program stored in the memory device 2.

At the time of initial activation (step S1 in FIG. 5), the portable communication terminal 10 selects a usage mode in accordance with the user (a selection through the basic module 21) (step S2 in FIG. 5). If the user selects the "simple-mode", the portable communication terminal 10 displays the "easy call" function, the "easy mail" function, and the "easy camera" function of the simple-mode basic module 211 on the menu screen (step S3 in FIG. 5). With this arrangement, the user can easily use the basic functions of call, mail, and camera, without having to peruse an instruction manual, when the user uses only those basic functions.

More specifically, when the "simple-mode" is selected, the only three functions of the "easy call" function (represented by a drawing of a receiver in FIG. 7), the "easy mail" function (represented by a drawing of an envelope in FIG. 7), and the "easy camera" function (represented by a drawing of a camera in FIG. 7) are displayed on the menu screen, but any extensible functions are not displayed on the menu screen. In this manner, the user can use the portable communication terminal 10 with the minimum number of menu items.

If the user selects the "custom-mode", the portable communication terminal 10 displays the "normal call" function, the "normal mail" function, and the "normal camera" function of the custom-mode basic module 212 on the menu screen (step S4 in FIG. 5). With this arrangement, the use can use those functions.

The portable communication terminal 10 then displays a message to inquire of the user whether to select the custom module (step S5 in FIG. 5), so that the user can select desired functions from the expansion module 22 (step S7 in FIG. 5), or all the functions can be displayed on the menu screen (step S6 in FIG. 5). If usage functions are selected, only the selected functions are displayed on the menu screen, so as to provide an optimum simple menu for each user.

As shown in FIG. 4, in a case where the usage functions of the expansion module 22 are selected, the "web browsing function" 2210, the "application function" 2211, and the "full-browser function" 2213 are in used (displayed on the menu), and the "music replaying function" 2212 in unused (not displayed on the menu).

In selecting a usage mode (step S11 in FIG. 6), the portable communication terminal 10 selects the usage mode in accordance with the user (a selection of the basic module 21) (step S12 in FIG. 6). If the "simple-mode" is selected by the user, the portable communication terminal 10 displays the "easy call" function, the "easy mail" function, and the "easy camera" function of the simple-mode basic module 211 on the menu screen (step S13 in FIG. 6). With this arrangement, the user can easily use the basic functions of call, mail, and camera, without having to peruse an instruction manual, when the user uses only those basic functions.

In brief, when the "simple mode" is selected, only the three functions of the "easy call" function (represented by the drawing of a receiver in FIG. 7), the "easy mail" function (represented by the drawing of an envelope in FIG. 7), and the "easy camera" function (represented by the drawing of a camera in FIG. 7) are displayed on the menu screen, but any extensible functions are not displayed on the menu screen. In this manner, the user can use the portable communication terminal 10 with the minimum number of menu items.

If the "custom-mode" is selected by the user, the portable communication terminal 10 displays the "normal call" function, the "normal mail" function, and the "normal camera" function of the custom-mode basic module 212 on the menu screen (step S14 in FIG. 6). With this arrangement, the user can use those functions.

The portable communication terminal 10 then displays a message to inquire of the user whether to select the custom module (step S15 in FIG. 6), so that the user can select desired functions from the expansion module 22 (step S17 in FIG. 6), or all the functions can be displayed on the menu screen (step S16 in FIG. 6). If usage functions are selected, only the selected functions are displayed on the menu screen, so as to provide an optimum simple menu for each user.

In FIG. 7, when the user presses the menu button while a stand-by screen 30 is displayed, a menu screen 33 appears. When the "easy mail" function is selected, for example, the drawing of an envelope is put on the front, as shown in a menu screen 31. Likewise, when the "easy call" function is selected, the drawing of a receiver is put on the front, as shown in a menu screen 32. When the "easy camera" function is selected, the drawing of a camera is put on the front, as shown in a menu screen 34.

FIG. 7 shows the menu screens to be displayed when the "simple-mode" is selected. If the "custom-mode" is selected, functions selected on the usage function selection screen of the expansion module 22 (the screen to be displayed in step S7 in FIG. 5), as well as the three functions of "call", "mail", and "camera" of the basic module 21, are displayed on the menu screen.

It is possible to activate a menu screen in cooperation with a selection device such as a pointer function (an input interface function that can move a pointer like a mouse on the display screen of the portable communication terminal by moving an enter button at the center of the arrow keys). If the selection device such as the pointer function is activated while the stand-by screen 30 is displayed, the function selection screen of the menu screen 33 is displayed.

If the menu button is pressed through the stand-by screen 30, and the selection device such as the pointer function is then activated while the menu screen 31 is displayed, a menu item can be selected with the use of the pointer function, as shown in the menu screen 34.

On the menu screen, an icon that is selected through the arrow keys or the selection device such as the pointer function is enlarged, so that anyone can easily understand. Users who use only the normal functions can also understand instinctively. The functions that are activated in cooperation with the pointer function can be switched ON/OFF as options.

There is a function setting button (represented by the drawing of a spanner) at the lower right corner of each menu screen on display, as shown in the menu screen 31 and the menu screen 33. The function setting button is selected to launch the screen mentioned in FIG. 8. In the operation illustrated in FIG. 8, the usage mode and usage functions are reset, a mode and functions are set to avoid inadvertent operations, and other settings can be performed after an input of a secret identification code of the portable communication terminal 10.

When resetting is chosen on the menu screen (step S21 in FIG. 8), the portable communication terminal 10 determines whether to change the usage mode (step S22 in FIG. 8). If the user chooses not to change the usage mode, the portable communication terminal 10 determines whether to change the usage functions (step S23 in FIG. 8). If the user chooses not to change the usage functions, the portable communication terminal 10 does not make any change (step S31 in FIG. 8), and ends the operation.

If the user chooses to change the usage functions, the portable communication terminal 10 moves on to the usage function selection screen displayed in step S7 of FIG. 5 (step S27 in FIG. 8) in accordance with whether the "easy camera" function, the "easy mail" function, and the like in the "simple-mode" are currently being used (step S25 in FIG. 8), or the "normal camera" function, the "normal mail" function, and the like in the "custom-mode" are currently being used, after an input of the secret identification code (step S24 in FIG. 8).

If the user chooses to change the usage mode, the portable communication terminal 10 displays a message to the effect that "The present settings are about to be reset. Is it OK?" (step S28 in FIG. 8). If the user selects "NO", the portable communication terminal 10 does not make any change (step S31 in FIG. 8), and ends the operation.

If the user chooses "YES", the portable communication terminal 10 moves on to the usage mode selection screen displayed in step S11 of FIG. 6 (step S30 in FIG. 8) after an input of the secret identification code (step S29 in FIG. 8).

In this exemplary embodiment, if the "simple-mode" is selected at the time of initial activation as described above, the expansion module 22 cannot be used. However, when the user has become used to the "simple-mode" and wishes to add functions, it is possible to select and add with expansion functions while using the basic module 21 in the "simple-mode".

The usage functions are limited in the "simple-mode", so that an easy menu is provided for users who do not use many functions. However, expandability is also limited in that case. Therefore, the function of realizing a function expansion also can be added, when users who have become used to the "simple-mode" hopes to attain extensive functions.

By selecting the "simple-mode" in the setting procedure at the time of initial activation shown in FIG. 5, the "easy call" function, the "easy mail" function, and the "easy camera" function are automatically set, as shown in the basic module 21 of FIG. 3.

The "easy call" function and the "easy mail" function are designed to facilitate reading of addresses from the address book through the GUI or an audio input, as described above. In FIG. 9, reference numeral 41 indicates an example of the display screen when a call is received through the "easy call" function. Reference numeral 42 indicates an example of the display screen during a call through the "easy call" function. Reference numeral 43 indicates an example of the display screen when a call is transmitted through the "easy call" function.

The "easy camera" function is designed to enable each user to automatically take optimum photographs, without having to set AF, white balance, contrast, flash, and image size, which are required for a regular camera function, as described above.

When the camera unit 18 is activated, the menu button and the function setting display of AF, white balance, contrast, flash, image size, and the like are not displayed, but only an image as a finder and a "photo" button are displayed on the screen. This is for users who are not familiar with how to use the photographing function but wishes to take photographs. With this arrangement, users smoothly can take clear photographs, without special settings.

By selecting the "simple-mode", only the icons of call, mail, and camera functions are displayed on the menu screen for users, as shown in the menu screens 31, 32, and 34 in FIG. 7. This is a very simple menu even for a user who does not need to use complicated functions. As shown in FIG. 4, the usage module is designed to be displayed on the menu, and there is specially no need to maintain a memory to store the menu settings of each user.

Users who use particular functions frequently should select the "custom-mode" so as to choose only the particular functions at the time of initial activation. In this manner, each user does not need to take the trouble of creating an original menu, and an optimum menu can be provided for each user. In the "custom-mode", it is possible to display all the functions on the menu.

In the "simple-mode", a menu that shows only the icons of call, mail, and camera functions is displayed from the start. In the "custom-mode", a menu that shows selected functions is displayed. Accordingly, it is possible to provide a menu that is useful to everyone, instead of a conventional menu that is useful only to a particular one.

As described above, in this exemplary embodiment, by selecting a usage mode at the time of initial activation, it is possible to realize a function menu of the portable communication terminal 10 that is useful to all users including users who use only the basic functions, users who customizes a menu to use only selected functions, and users who want all the function to be displayed and wish to use all the functions.

In this exemplary embodiment, each user selects a usage mode at the time of initial activation, so that the user can easily use only the basic functions (the call, mail, and camera functions, as described above) of the portable communication terminal 10 without having to peruse the instruction manual.

In this exemplary embodiment, if the "simple-mode" is selected at the time of initial activation, the "easy call" function and the "easy mail" function can be used in which a desired address can be easily selected from an address book with voice guidance or the like. When a camera function is used, specific settings of AF, flash, contrast, image size, and the like are normally required. In this exemplary embodiment, however, users can easily take photographs through the "easy camera" function which set such functions automatically, without taking the trouble of reading the instruction manual.

Moreover, in this exemplary embodiment, there are many functions and buttons of the portable communication terminal 10 not to be used in the "simple-mode". Therefore, there is an advantage that the power consumption can be reduced by completely turning off those modules and buttons.

Also, in this exemplary embodiment, users can select desired functions from the expansion module 22 when the "custom-mode" is selected. Many users use their portable telephone devices, leaving the functions that are not to be used but are still displayed on the displays of the portable telephone devices. As a result, those users have trouble in accessing desired functions. To counter this problem, only the necessary functions are selected in this exemplary embodiment, so as to provide a simple menu that does not show functions that are not to be used. However, it is still possible to display all the functions in this exemplary embodiment conventionally.

As described above, this exemplary embodiment can provide a portable communication terminal that is useful to all users including those who need only the basic functions, those who select functions and customize easy-to-use menus, and heavy users who want all the functions to be displayed and use them.

Next, the effects of the use of a pointer function in cooperation with the above described menu are described. A menu screen 35 is activated at the same time as the activation of the pointer function from a stand-by screen 40. The menu screen 35 shows only the functions necessary for the user, so that the user can use a desired function simply by instinctively pointing an arrow to the desired function.

At present, users who do not need many sophisticated functions are not making good use of the menu displays of conventional portable telephone devices on which icons are to be selected with the use of the arrow keys and the enter key at the center. This is because those users have no clue what to do with so many buttons.

With the pointer function, it is possible to select and enter icons with the use of only one button. Accordingly, users who do not need sophisticated functions can easily understand the pointer function. Also, since the menu screen 35 is customized for such users, users who wish to use only the basic functions (the call, mail, and camera function) of the portable communication terminal 10 can easily make good use of the portable communication terminal 10, without having to read the instruction manual.

FIG. 9 shows a menu that is displayed when a user uses the "easy call" function in the "simple-mode". When a call is received, the call can be started by the pointer function (it is possible to chose an any-key answer), as shown in a menu screen 41. During the call, it is possible to adjust the volume by the pointer function, as shown in a menu screen 42. When the "easy call" function is activated, it is possible to start a call by searching for an address with a voice, as shown in a menu screen 43. In this manner, easy settings for users can be provided.

INDUSTRIAL APPLICABILITY

The present invention can be applied to portable communication terminals that are electronic devices having a large number of functions and menus, are to be used by various types of users, and realize "all in one but simple" devices through customized a menu. In this manner, the present invention can provide electronic devices that can realize an optimum menu to each user, by deleting incorporated unnecessary functions from a menu display.

BRIEF DESCRIPTION OF THE DRAWINGS

FIG. 9 illustrates the "easy call" function of a portable communication terminal in accordance with an exemplary embodiment of the present invention.

Figure 1:
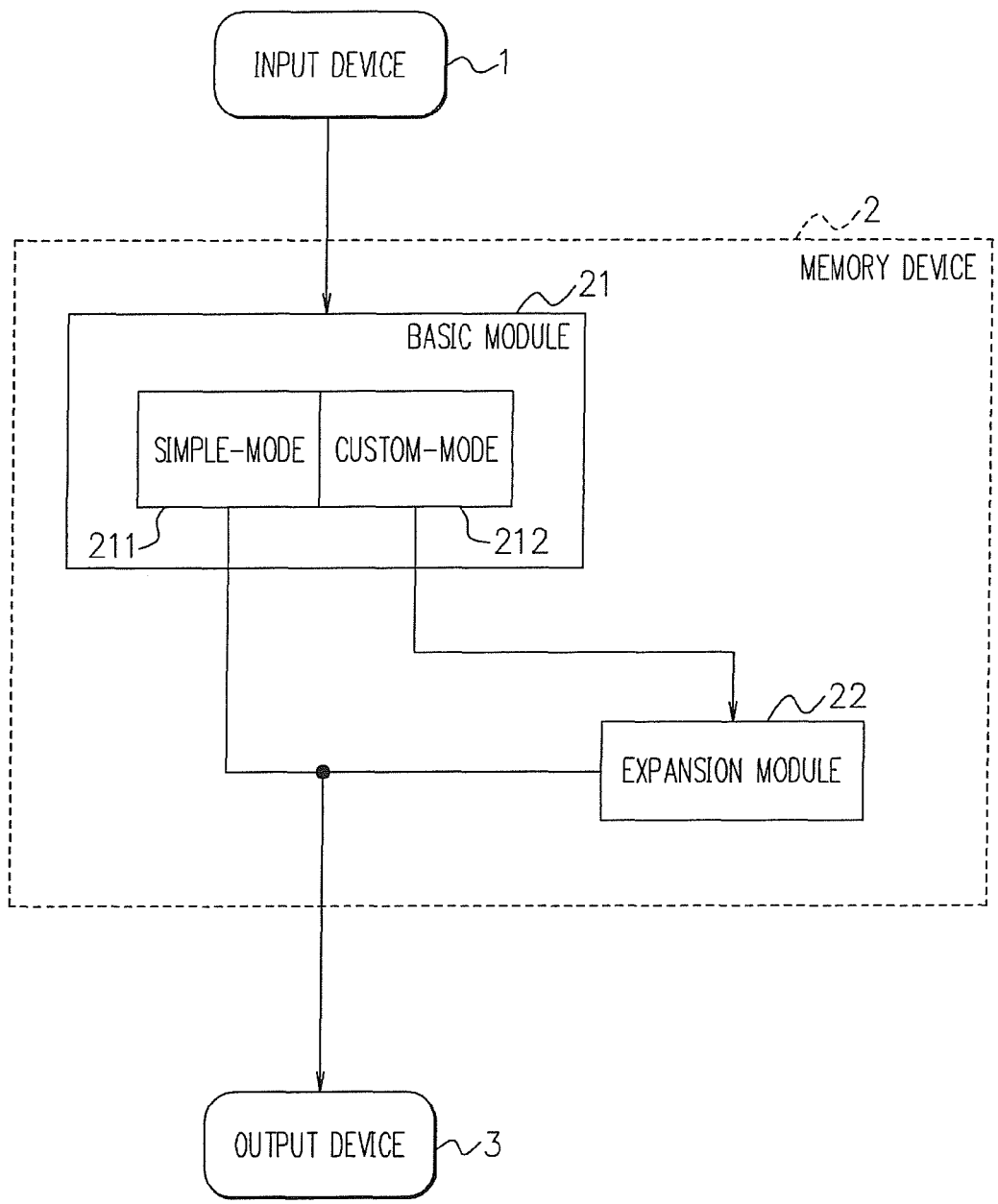
FIG. 1 is a block diagram showing an example structure of a portable communication terminal in accordance with an exemplary embodiment of the present invention.
Figure 2:
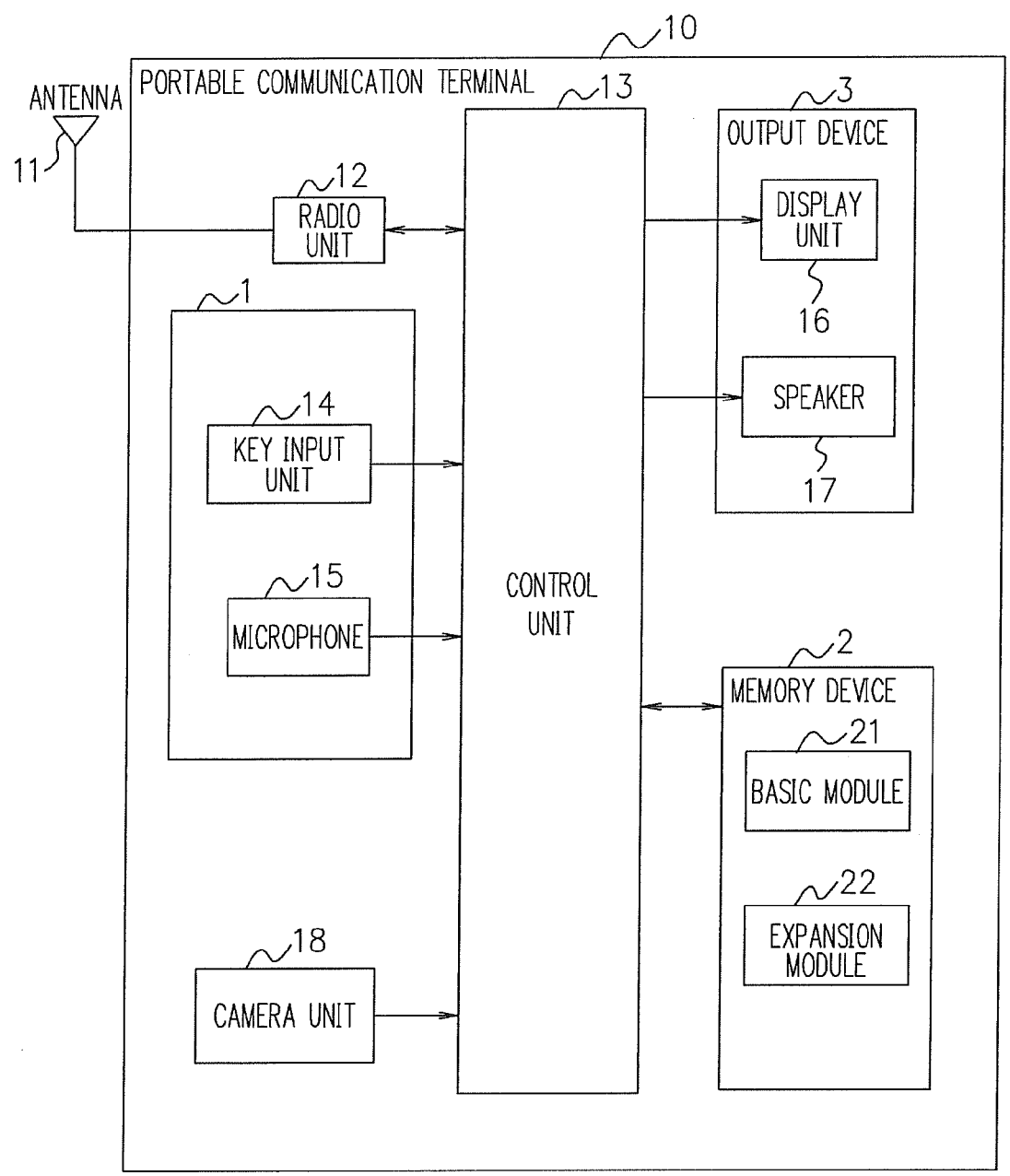
FIG. 2 is a block diagram showing a specific example structure of a portable communication terminal in accordance with an exemplary embodiment of the present invention.
Figure 3:
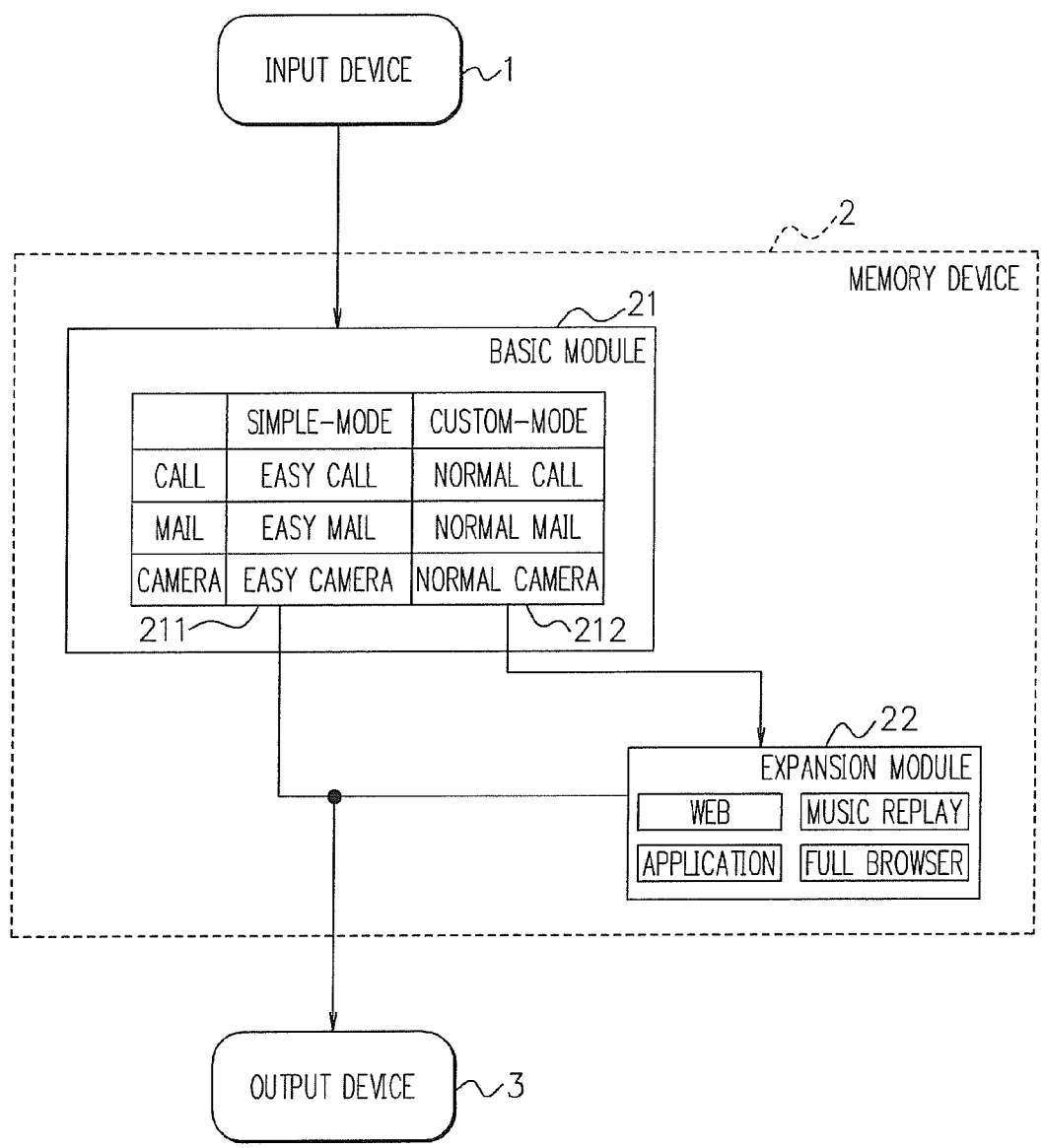
FIG. 3 is a block diagram showing a specific example of the basic module of FIG. 1.
Figure 4:
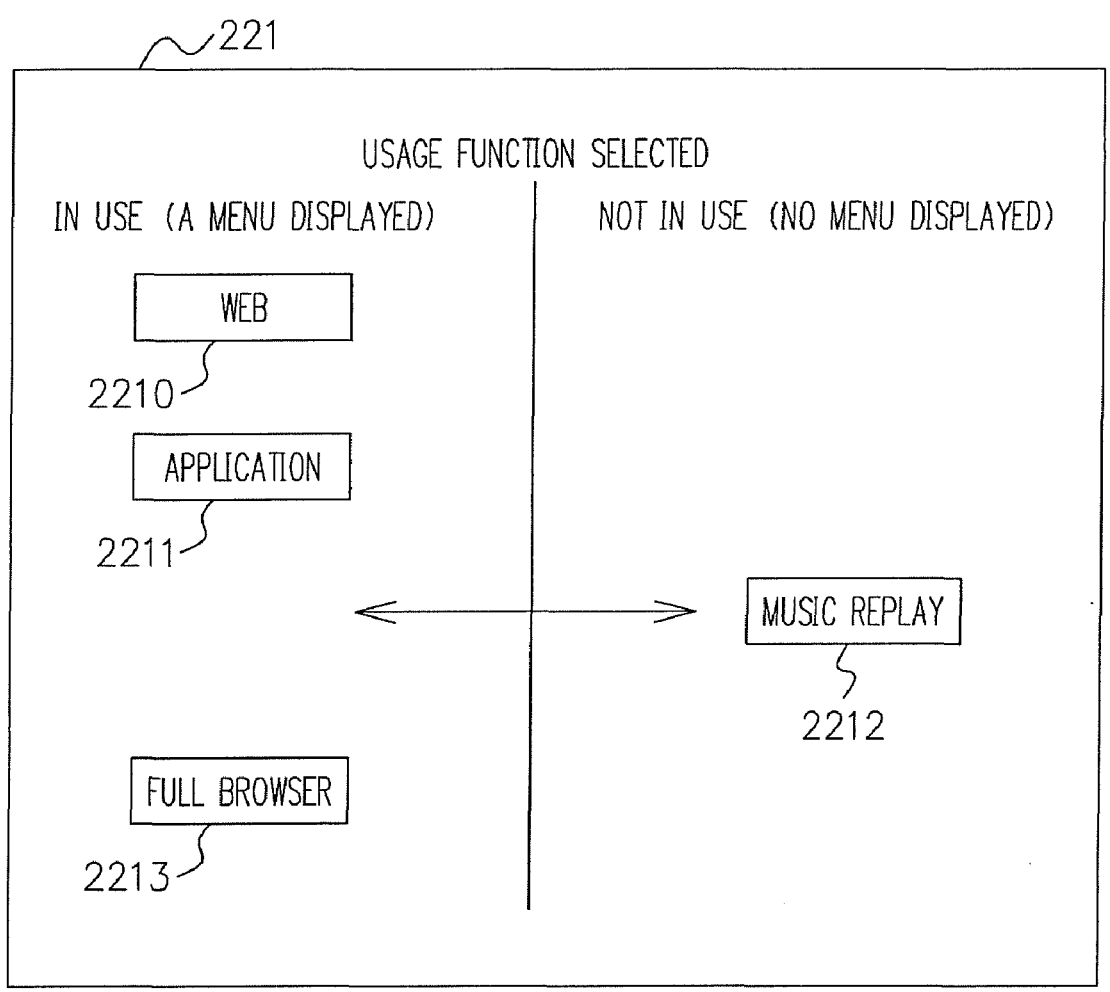
FIG. 4 shows a selection of usage functions by the expansion module in accordance with an exemplary embodiment of the present invention.
Figure 5:
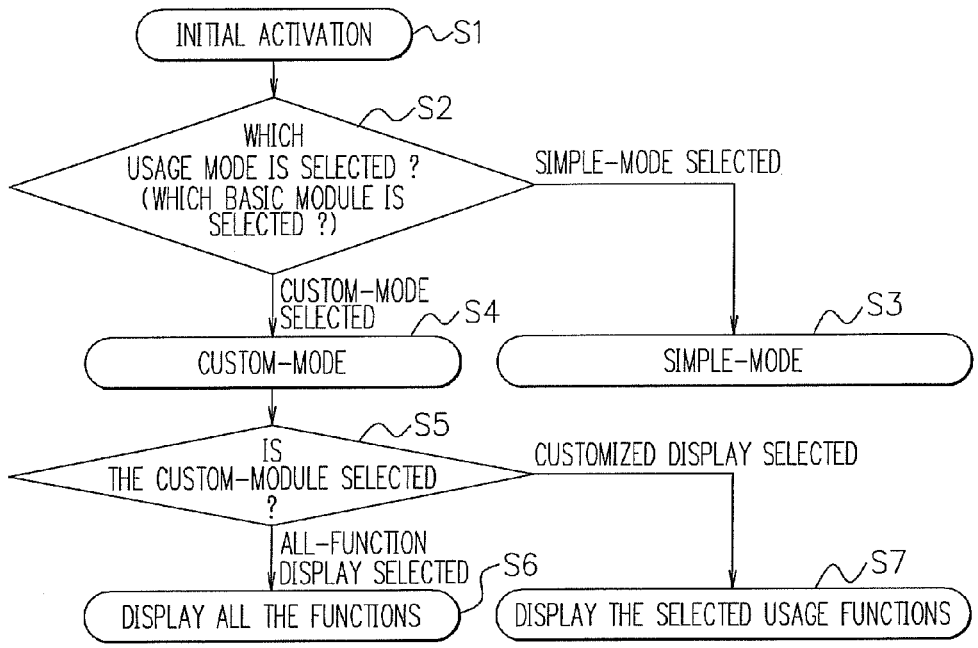
FIG. 5 is a flowchart showing a menu displaying operation to be performed by a portable communication terminal at the time of initial activation in accordance with an exemplary embodiment of the present invention.
Figure 6:
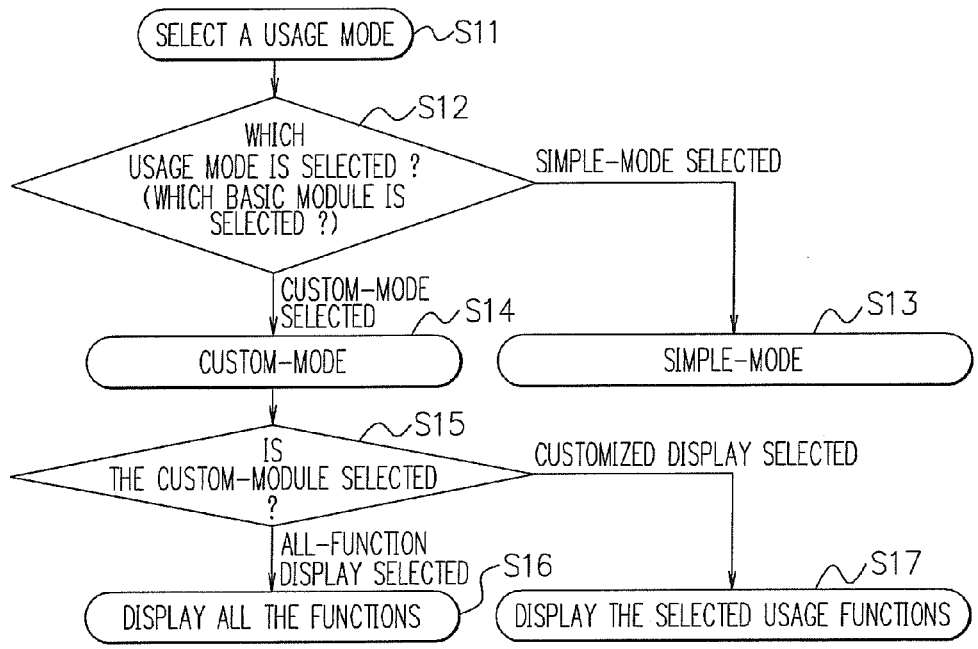
FIG. 6 is a flowchart showing a usage mode selecting operation to be performed by a portable communication terminal in accordance with an exemplary embodiment of the present invention.
Figure 7:
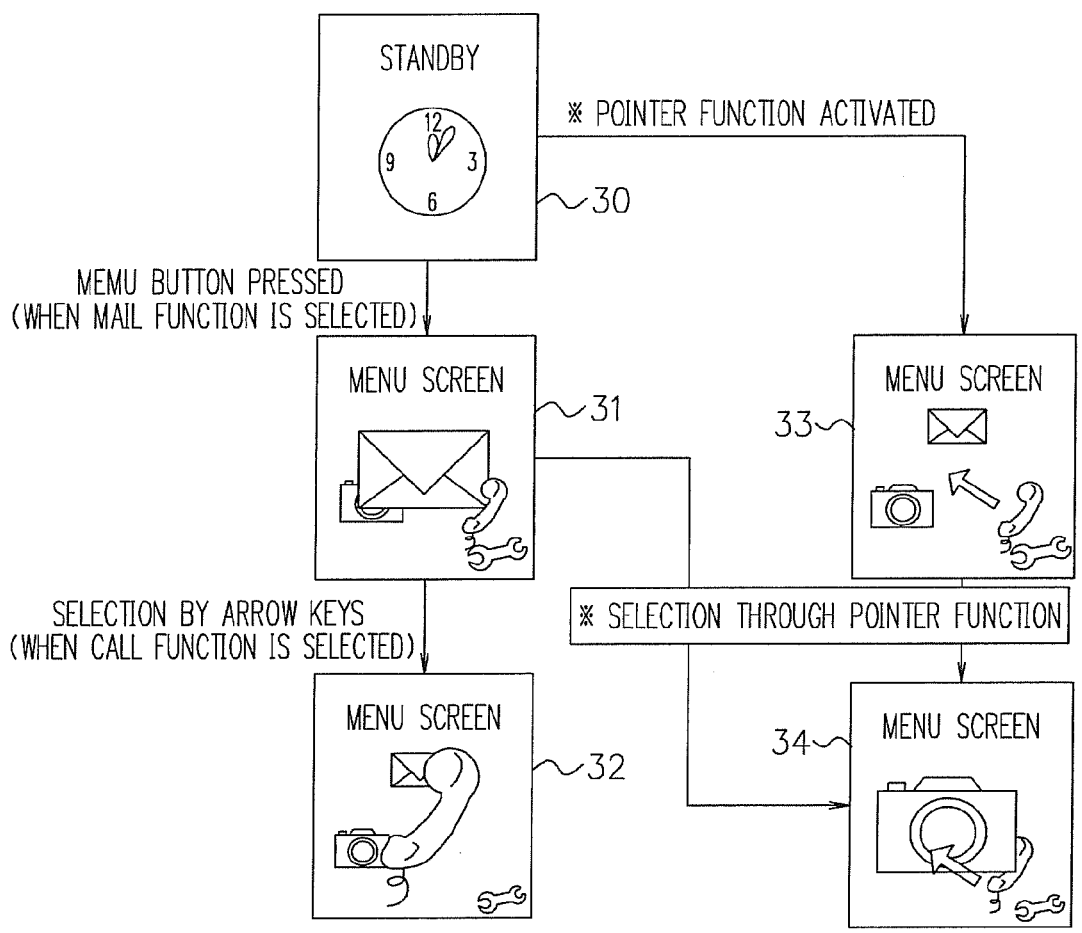
FIG. 7 shows a menu displaying operation to be performed by a portable communication terminal in accordance with an exemplary embodiment of the present invention.
Figure 8:
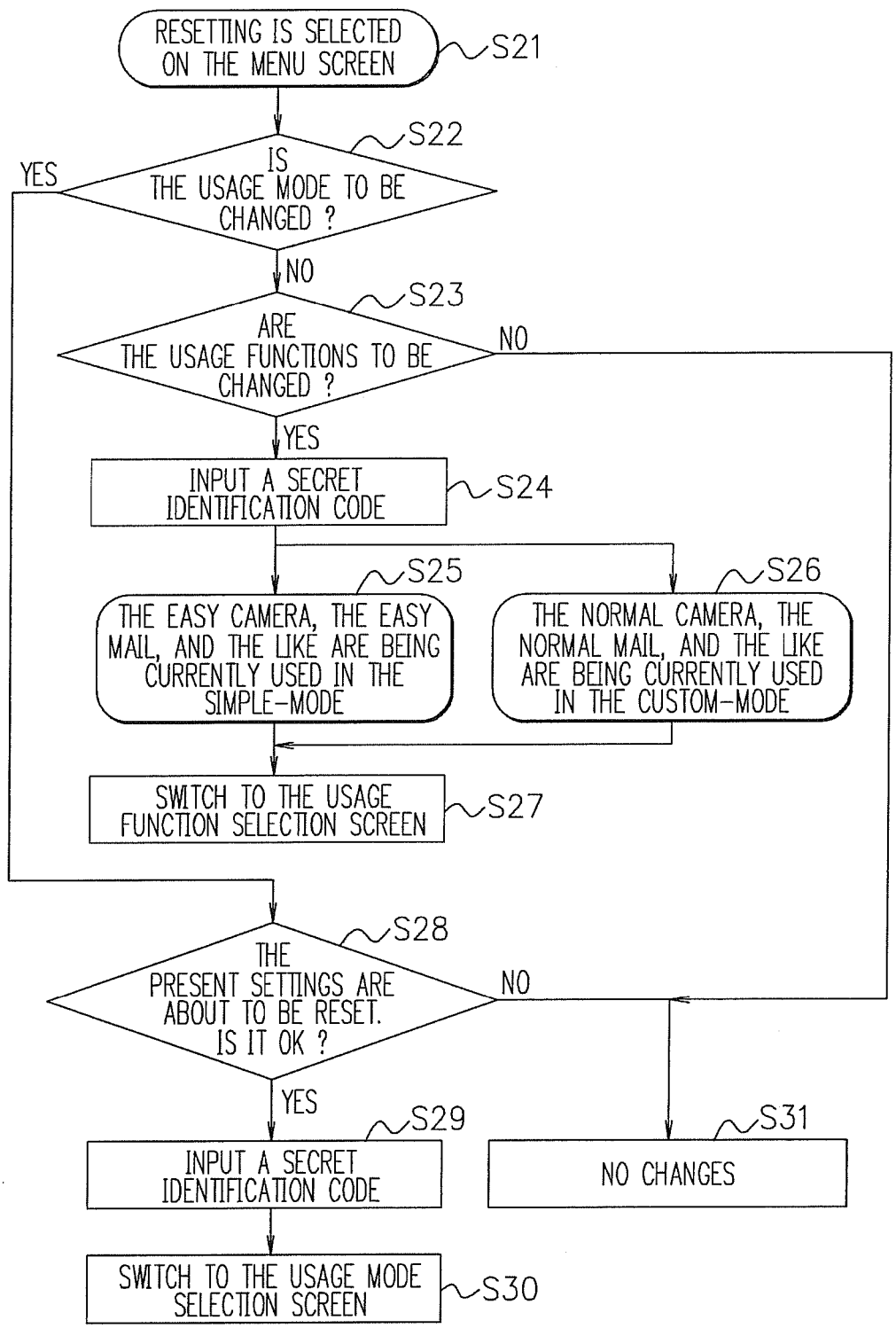
FIG. 8 is a flowchart showing a menu displaying operation to be performed by a portable communication terminal at the time of resetting in accordance with an exemplary embodiment of the present invention.

DESCRIPTION OF REFERENCE NUMERALS 1 input device
2 memory device
3 output device
10 portable communication terminal
11 antenna
12 radio unit
13 control unit
14 key input unit 15 microphone
16 display unit
17 speaker
18 camera unit
21 basic module
22 expansion module
211 simple-mode basic module
212 custom-mode basic module

The invention claimed is:

1. A portable communication terminal that includes various functions and is capable of displaying a menu showing the functions,
the portable communication terminal comprising:
a screen implemented at least in hardware;
a memory device that stores a simple-mode basic module that is designed for displaying a menu on the screen showing only preset particular functions on the screen, and a custom-mode basic module that is designed for displaying a menu showing only functions selected by setting from outside on the screen, the memory device implemented at least in hardware; and
a control unit, wherein:
the control unit displays a user interface on the screen for selecting one of the simple mode and the custom mode at the time of initial activation; and
the control unit reads the basic module corresponding to the selected mode on the screen from the memory device, and activates the basic module,
wherein the custom mode is provided by a service provider without assistance from a user of the portable communication terminal, the custom mode common to a plurality of portable communication terminals including the portable communication terminal, such that a same custom mode is provided on each portable communication terminal by the service provider, the user being one of a plurality of target users to which the plurality of portable communication terminals are directed.

2. The portable communication terminal according to claim 1, wherein the preset particular functions include at least a call function, an electronic mail function, and a camera function.

3. The portable communication terminal according to claim 2, wherein the call function and the electronic mail function are an "easy call" function and an "easy mail" function that are designed to easily select an address from an address list with addresses stored in advance.

4. The portable communication terminal according to claim 2, wherein the camera function is an "easy camera" function that sets at least AF (Auto Focusing), white balance, contrast, flash, and image size to predetermined values that are required for photographing, and activates a photographing function.

5. The portable communication terminal according to claim 1, further comprising
a unit that displays a menu for each user as a default on the screen, the menu being selected at the time of initial activation.

6. The portable communication terminal according to claim 1, wherein the custom-mode basic module allows at least one of the menu showing only the functions selected by setting from outside and the menu showing all the functions to be displayed on the screen.

7. The portable communication terminal according to claim 1, wherein
the control unit simultaneously displays a menu for each user at the time of activation of a pointer function that moves a pointer, the menu being selected at the time of initial activation, the pointer appearing on the screen when an enter button at the center of arrow key is pressed.

8. The portable communication terminal according to claim 7, wherein
the control unit allows a call in accordance with an instruction that is made with the use of the pointer function when the call is received.

9. The portable communication terminal according to claim 7, wherein
the control unit adjusts volume in accordance with an instruction that is made with the use of the pointer function during a call.

10. A function menu display method to be utilized in a portable communication terminal that includes various functions and is capable of displaying a menu showing the functions on a screen,
the method comprising:
displaying a screen for selecting one of a simple-mode in which a menu showing only preset particular functions is displayed on the screen, and a custom-mode in which a menu showing only functions selected by setting from outside is displayed on the screen at the time of initial activation; and
reading a basic module corresponding to the selected mode on the screen from a memory device that stores a simple-mode basic module and a custom-mode basic module, and activating the basic module,
wherein the custom mode is provided by a service provider without assistance from a user of the portable communication terminal, the custom mode common to a plurality of portable communication terminals including the portable communication terminal, such that a same custom mode is provided on each portable communication terminal by the service provider, the user being one of a plurality of target users to which the plurality of portable communication terminals are directed.

11. The function menu display method according to claim 10, wherein the preset particular functions include at least a call function, an electronic mail function, and a camera function.

12. The function menu display method according to claim 11, wherein the call function and the electronic mail function are an "easy call" function and an "easy mail" function that are designed to easily read an address from an address list with addresses stored in advance.

13. The function menu display method according to claim 11, wherein the camera function is an "easy camera" function that sets at least AF (Auto Focusing), white balance, contrast, flash, and image size to predetermined values that are required for photographing, and activates a photographing function.

14. The function menu display method according to claim 10, further comprising
displaying a menu for each user as a default on the screen, the menu being selected at the time of initial activation.

15. The function menu display method according to claim 10, wherein the custom-mode basic module allows at least one of the menu showing only the functions selected by setting from outside and the menu showing all the functions to be displayed on the screen.

16. The function menu display method according to claim 10, further comprising
simultaneously displaying a menu for each user at the time of activation of a pointer function that moves a pointer, the menu being selected at the time of initial activation, the pointer appearing on the screen when an enter button at the center of arrow key is pressed.

17. The function menu display method according to claim 16, further comprising
allowing a call in accordance with an instruction that is made with the use of the pointer function when the call is received.

18. The function menu display method according to claim 16, further comprising
adjusting volume in accordance with an instruction that is made with the use of the pointer function during a call.

19. A non-transitory computer-readable data storage medium storing a program that is executable by a processor, where execution of the program by the processor is for displaying a function menu on a screen of a portable communication terminal that includes various kinds of functions and is capable of displaying the function menu showing the functions on a screen,
the program being executed to cause the processor of the portable communication terminal to:
display a screen for selecting one of a simple-mode in which a menu showing only preset particular functions is displayed on the screen, and a custom-mode in which a menu showing only functions selected by setting from outside is displayed on the screen at the time of initial activation; and
read a basic module corresponding to the selected mode on the screen from a memory device that stores a simple-mode basic module and a custom-mode basic module, and activate the basic module,
wherein the custom mode is provided by a service provider without assistance from a user of the portable communication terminal, the custom mode common to a plurality of portable communication terminals including the portable communication terminal, such that a same custom mode is provided on each portable communication terminal by the service provider, the user being one of a plurality of target users to which the plurality of portable communication terminals are directed.

20. A portable communication terminal that includes various functions and is capable of displaying a menu showing the functions on a screen,
the portable communication terminal comprising:
a memory device that stores a simple-mode basic module that is designed for displaying a menu showing only preset particular functions on the screen, and a custom-mode basic module that is designed for displaying a menu showing only functions selected by setting from outside on the screen;
displaying means for displaying a screen for selecting one of the simple mode and the custom mode at the time of initial activation; and
reading means for reading the basic module corresponding to the selected mode on the screen from the memory device, and activates the basic module,
wherein the custom mode is provided by a service provider without assistance from a user of the portable communication terminal, the custom mode common to a plurality of portable communication terminals including the portable communication terminal, such that a same custom mode is provided on each portable communication terminal by the service provider, the user being one of a plurality of target users to which the plurality of portable communication terminals are directed.

* * * * *